Patented July 9, 1946

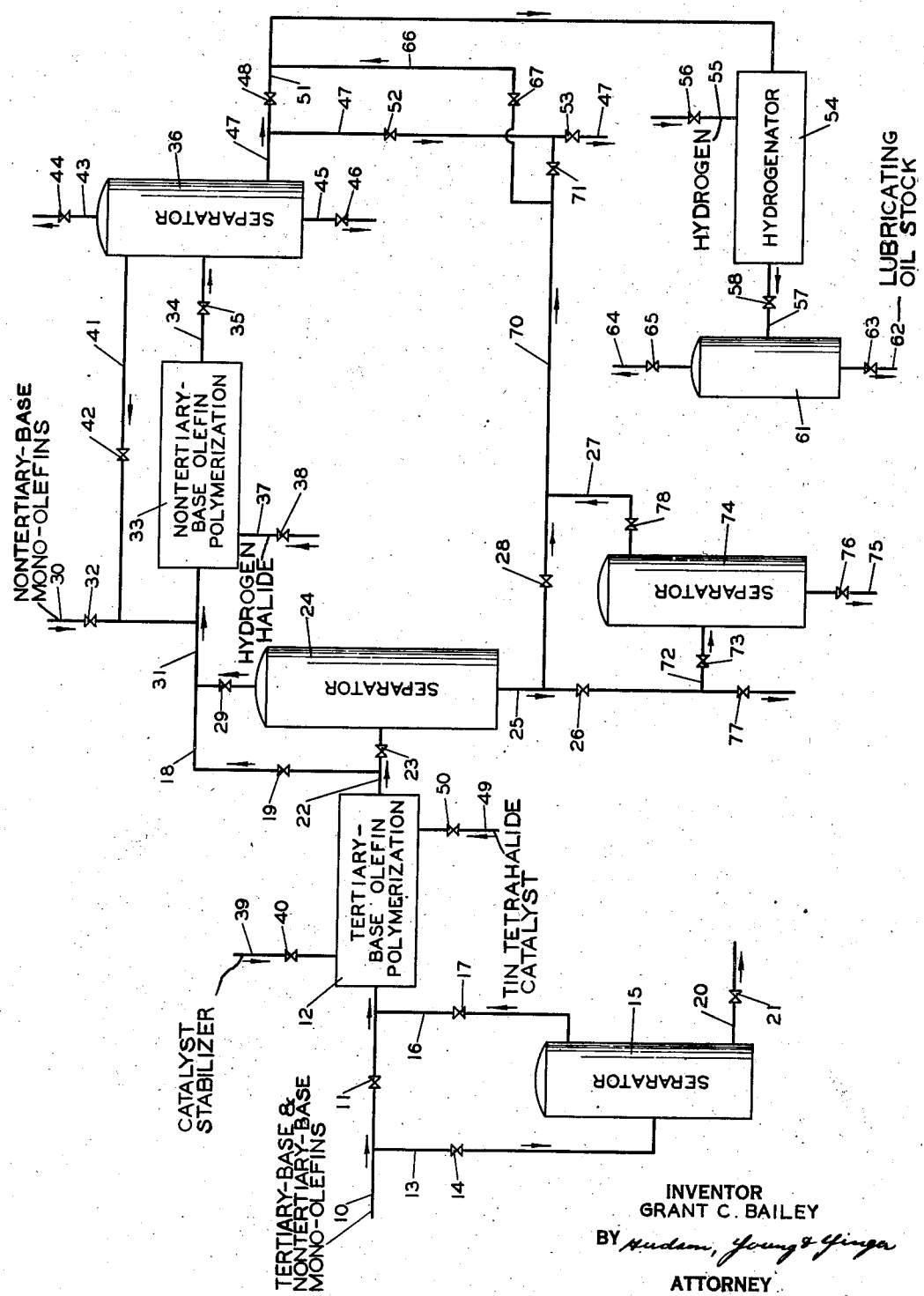

2,403,779

UNITED STATES PATENT OFFICE 2,403,779

PROCESS FOR TREATMENT OF OLEFIN-CONTAINING MIXTURES

Grant C. Bailey, Bartlesville, Okla., assignor to Phillips Petroleum Company, a corporation of Delaware Application October 30, 1941, Serial No. 417,207

4 Claims. (Cl. 260—683.15)

This invention relates to the catalytic polymerization of olefins, and more particularly it relates to the polymerization of selected olefins contained in a hydrocarbon mixture. It further relates to the production of an optimum yield of superior lubricating oil stock from a mixture of low-boiling olefins.

The catalytic polymerization of olefins to compounds of higher molecular weight is well known. Charge stocks for such processes are preferably mono-olefins, and include normally gaseus or liquid olefins prepared by dehydrogenation of paraffins, dehydration of alcohols, cracking or dehydrogenation of waxes or gas oils, etc. The olefins may be used either singly or mixed with other olefins or inert diluents. The reactions may be effected over a wide range of temperature, but usually in the range of from −30° F. to 200° F. The active metal halides are preferred as catalysts such as aluminum chloride, zirconium chloride, boron fluoride, and the like, used either alone or in combination with various modifiers such as are well known, including inorganic materials such as sodium chloride and organic materials such as ketones, etc.

In polymerization reactions, as briefly outlined above, oils may be obtained having widely varying characteristics, depending markedly on both the olefin charge and the properties and conditions of the polymerization system. In practice, the charges used for the preparation of oils frequently contain a wide variety of olefin reactants, even though one type may be in predominance.

Metal halides of the Friedel-Crafts type such as boron fluoride and aluminum chloride, generally polymerize olefins at a rapid rate. For example, when aluminum chloride is added to liquid isobutene at temperatures above about 0° F., the reaction proceeds with such rapidity that it is difficult to maintain the temperature of the reaction mixture at a constant value. Polymerization reactions using phosphoric acid type catalysts usually proceed much more slowly. Still other catalysts such as those comprising silica gel may require specific conditions of somewhat higher temperature and pressures to polymerize olefins at an appreciable rate.

In general, mono-olefins having the tertiary-base structure polymerize more rapidly than other types of mono-olefins. By tertiary-base olefins I intend to include, in general, such olefins which correspond to the formula $R_2C=CR'_2$ where each R is an alkyl group and each R' is hydrogen or any alkyl group. Such olefins, upon hydrolysis in an acidic medium, will generally yield a tertiary alcohol. Typical low-boiling tertiary-base olefins are 2-methyl-propene, 2-methyl-1-butene, 2-methyl-2-butene, 2-methyl-1-pentene, 2-methyl-2-pentene, 3-methyl-2-pentene and the like.

The rate at which mono-olefins are polymerized is also to some extent a function of the molecular weight of said olefins. In general, the higher molecular weight olefins polymerize less rapidly than the lower molecular weight olefins. There are, however, exceptions to this generalization, one of the most outstanding being ethylene which is polymerized with difficulty even by aluminum chloride catalyst.

In some polymerization processes it has been found that when a mixture of olefins is to be polymerized to form lubricating oil stocks, high yields of desirable products are rapidly obtained by first removing substantially all of the tertiary-base olefins and then polymerizing nontertiary-base olefins in the presence of a suitable catalyst to produce polymers suitable for use as lubricating oil stock. The most desirable polymers suitable for use as a lubricating oil stock are produced from the polymerization of individual nontertiary-base 1-olefins.

I have now found a satisfactory method of selectively polymerizing tertiary-base olefins which are present in a hydrocarbon mixture comprising also nontertiary-base mono-olefins. More specifically I have found a catalyst material that will polymerize tertiary-base olefins, such as isobutene, without promoting appreciable polymerization of other types of mono-olefins such as nontertiary-base mono-olefins, that may be present in a hydrocarbon mixture. Such catalyst material comprises a tin tetrahalide, preferably in conjunction with a stabilizer, such as will be discussed hereinafter. As a tin tetrahalide catalyst I include mixtures of tin tetrahalides, such as a mixture of tin tetrachloride and tin tetrabromide, and also mixed tin tetrahalides, such as tin tribromochloride, tin dibromodichloride, tin bromotrichloride, and the like.

One object of this invention is to selectively polymerize olefins.

Another object of this invention is to polymerize only tertiary-base olefins in a hydrocarbon mixture containing tertiary-base olefins and nontertiary-base mono-olefins.

Another object of this invention is to produce a lubricating oil base stock having superior qualities from low-boiling olefins.

Still another object of this invention is to provide a superior catalytic conversion system for the production of desired oils from olefins.

A further object of this invention is to purify an olefin-containing mixture in such a manner that undesirable materials, such as tertiary-base olefins and/or compounds containing reactive oxygen, sulfur, nitrogen, and the like, are removed.

Other objects and advantages of my invention will be apparent from the accompanying disclosure and discussion.

Tin tetrahalides such as tin tetrachloride and tin tetrabromide have been classed by other workers in the art as active metal halide catalysts and as Friedel-Crafts type catalysts, along with aluminum chloride, aluminum bromide, boron fluoride and the like. I have found, however, that the tin tetrahalides differ fundamentally from such catalysts in their polymerization characteristics. Aluminum chloride, aluminum bromide, boron fluoride and the like readily polymerize nontertiary-base mono-olefins such as propene, butene-1, butene-2, pentene-1, and the like. Hereinafter, such catalysts will be termed metal halide catalysts which are active for the polymerization of nontertiary-base olefins. However, tin tetrahalides, such as tin tetrachloride and tin tetrabromide, do not polymerize such compounds to any detectable extent under the reaction conditions which form a part of my invention, but only polymerize tertiary-base olefins, such as isobutene, as will be clearly shown hereinafter. For example, I have found that neither n-pentene-1, n-pentene-2, n-hexene-1, nor n-octene-1 can be polymerized in the presence of a tin tetrahalide at a temperature equal to or below the boiling points of said compounds at atmospheric pressure, although at the higher temperatures halogenation reactions appeared to take place. My invention is based, therefore, upon the discovery that tin tetrahalides, per se, are completely selective in their catalyzing action for the polymerization of only tertiary-base olefins under the reaction conditions which form a part of my invention, and not upon determining conditions at which a known polymerization catalyst will promote the polymerization of tertiary-base olefins sufficiently faster than the polymerization of other olefins that a selective polymerization may be accomplished. Furthermore, I have found that tin tetrahalide catalysts do not appear to promote copolymerization reactions between tertiary-base olefins and other mono-olefins, so that tin tetrahalide catalysts may be used to decrease the content of tertiary-base olefins in a mixture without concomitantly decreasing the content of other mono-olefins. It is a characteristic of catalysts such as aluminum chloride, boron fluoride, zirconium tetrachloride and the like, that in the polymerization of olefins the reaction is promoted by the presence of the corresponding hydrogen halide or a compound that produces hydrogen halide under the conditions of the reaction, such as water or tertiary butyl chloride. Other types of modifiers, such as organic nitro compounds, ketones, ethers, and the like, have little or no apparent effect and in some cases may even have a tendency to lower the reaction rate. I have found that tin tetrahalides, particularly tin tetrachloride and tin tetrabromide, when used as catalysts in olefin polymerization reactions show unique response to added modifiers. As an illustration, when a tin tetrahalide comprises the catalytic material for facilitating the polymerization of olefins, the presence of hydrogen halide actually inhibits said reaction. This is in direct contrast to the action exhibited by the presence of a hydrogen halide in the presence of an aluminum chloride type of catalyst for a similar charge stock. Also, when passing isobutene for example, in intimate contact with a tin tetrahalide, such as tin tetrachloride at atmospheric pressure and room temperature, said isobutene is rapidly polymerized with evolution of heat. However, the reaction rate gradually decreases with a concomitant separation of a light amorphous precipitate, apparently a complex stannous compound. The activity of the catalyst for such reactions can be increased and maintained for a prolonged length of time by the use of selected organic stabilizers. Such stabilizers include nitro hydrocarbons, such as nitromethane and nitrobenzene, and ketones having an alpha carbon atom to which is attached a single hydrogen atom, such as methyl-isopropyl ketone, diisopropyl ketone, and isopropyl-phenyl ketone. Other types of ketones, such as acetone, acetophenone, benzophenone, and cyclohexanone, do not act as stabilizers for the reaction.

Relatively large proportions of such organic stabilizers are necessary to influence the polymerization rate in a positive manner for a suitable period of time. For example, in the polymerization of isobutene at room temperature, and atmospheric pressure using tin tetrachloride catalyst, it was necessary to add 0.1 mole per cent of nitrobenzene, based on the number of moles of tin tetrachloride in the system, to obtain appreciable stabilizing action; this was effective for only a short time. In contrast, the addition of 65 mole per cent of nitrobenzene on the same basis not only accelerated the polymerization but maintained the catalyst activity at a constant value for a prolonged period of time.

Although it may be that the factors which result in eventual decrease in activity when a small amount of stabilizer is present will eventually cause deactivation of catalyst even when a larger amount of stabilizer is present, it is to be appreciated that the actual factors which affect the system containing catalyst and stabilizer are not yet completely known.

When producing products within the conventional lubricating oil range it is desirable that such products have viscosities ranging from about 100 seconds at 100° F. to about 200 seconds Saybolt viscosity at 210° F. although oils above and/or below this range may be useful for special purposes. The molecular weights of these desired products are normally greater than about 300 and less than 800, and generally they are less than 500, although products somewhat either side of these limits may at times be found desirable. The primary product of my process is a simple olefin polymer, having one double bond per molecule, and for use as a component of lubricating oil it is generally desirable to increase its stability toward oxidation, as by nondestructive hydrogenation. The hydrogenated or unhydrogenated product may be used as a lubricating oil as such, or may be blended with various other stocks to produce a composite lubricating oil. In some instances my process may be operated to produce olefinic products from the tertiary-base olefin polymerization and/or the nontertiary-base mono-olefin polymerization of somewhat lower molecular weight than that suitable for direct use as lubricating oil, and such olefinic products may be employed to alkylate aromatic hydrocarbons, such as benzene, or toluene, or their derivatives, to form hydrocarbons of suitable molecular weight and viscosity characteristics having also enhanced solvent characteristics and the like. Olefinic products suitable for such additional treatment are included, along with products suitable for direct use as lubricants, in the broader consideration of my invention, and are to be included in the term lubricating oil stocks.

According to this invention a mixture containing tertiary-base and nontertiary-base mono-olefins is treated with a tin tetrahalide, such as tin tetrachloride or tin tetrabromide, preferably in admixture with a stabilizer, as is described herein, at a temperature in a range of about 30 to 212° F. and at a pressure at which said olefin mixture is in the liquid state. Tin tetrachloride and tin tetrabromide are very soluble in hydrocarbons and under the conditions of treatment the system is homogeneous and the reaction takes place in a single liquid phase. The reaction is exothermic and suitable means of agitation and cooling should be provided for optimum results. By this treatment substantially only tertiary-base olefins are selectively converted to polymers, the lowest boiling of which is diisobutene having a boiling point of about 215 to 220° F. By conducting the polymerization at about room temperature, only a small proportion of isobutene polymer will consist of dimer. The remaining nontertiary-base mono-olefins may be separated from the reaction mixture by distillation, absorption methods, or any other means known to the art. Before a separation step, such as distillation, it may be desirable to remove tin halide catalyst, such as by extracting with cold water followed by filtration using an adsorptive clay filter aid, especially when the catalyst is tin tetrachloride. In some cases tin tetrahalide may be separated and purified in such a manner that it may be recycled to treat additional mixtures containing olefin hydrocarbons.

Besides promoting the removal of tertiary-base mono-olefins from mixtures containing such olefins, I have also found that tin tetrahalides can be used to separate diolefins, reactive organic oxygen-containing compounds, reactive organic sulfur compounds, and the like from mixtures containing such compounds and non-tertiary-base mono-olefins without appreciably affecting the nontertiary-base mono-olefins. Such a separation is accomplished by converting diolefins, reactive organic oxygen-containing compounds and reactive organic sulfur compounds into higher molecular weight compounds in the presence of a tin tetrahalide catalyst, these compounds often being insoluble in the unreacted hydrocarbon material.

When the material that is being treated by a tin tetrahalide is essentially a hydrocarbon mixture containing tertiary-base olefins and nontertiary-base mono-olefins and no appreciable amount of diolefins and when the tertiary-base olefin content of said mixture is substantially pure isobutene, polymerization at room temperature and sufficient pressure to result in a liquid phase will produce an appreciable proportion of polymer in the viscosity range of lubricating oil. On separation of this oil from the remainder of the mixture, such as by fractionation, an oil fraction is obtained having a relatively high viscosity index, higher than the viscosity index of a fraction of similar viscosity obtained by polymerizing substantially pure isobutene using aluminum chloride catalyst.

Removal of tertiary-base olefins from a mixture containing them is readily accomplished when the boiling range of the mixture is so narrow that the boiling range of the polymers produced by treatment with a tin tetrahalide is above the boiling range of said mixture. In such cases fractional distillation serves to separate polymeric material from unreacted mono-olefins. The catalyst and stabilizer are so chosen that they can be satisfactorily removed from the reaction mixture without interfering with subsequent usage of any other desirable component of the reaction mixture. Usually both catalyst and stabilizer are removed by extraction methods based on their own physical and/or chemical properties, as will be readily appreciated by one skilled in the art.

When a mixture to be treated according to my invention contains hydrocarbons having a comparatively wide range of molecular weights, for example from 3 to 16 carbon atoms per molecule, it is evident that after a treatment with a tin tetrahalide there may be an appreciable amount of tertiary-base olefin polymers within this molecular weight range. Such a situation may be undesirable and often should be avoided. This can be accomplished in most instances by separating such a mixture into fractions of narrower boiling range and treating each fraction separately. However, in specific cases special techniques may produce the desired result. For example, a mixture containing essentially olefin and some paraffin hydrocarbons having 6 to 16 carbon atoms per molecule was subjected to polymerization conditions to form products in the viscosity range of lubricating oils. The mixture comprised primarily straight chain mono-olefins but contained sufficient tertiary-base olefins, diolefins, oxygen-containing compounds, and the like that polymerization using zirconium tetrachloride plus hydrogen chloride promoter produced an oil having an unsatisfactorily low viscosity index.

When the mixture was first treated with tin tetrachloride together with diisopropyl ketone at a temperature of about 175 to 210° F. and sufficient pressure to allow liquid phase operation, the polymers produced were almost entirely below the molecular weight range of lubricating oils. Also, the tin tetrachloride reacted with undesirable compounds to form a precipitate. The reaction mixture was cooled, filtered and the catalyst removed by the extraction with cold water. The purified effluent which still contained a small amount of diisopropyl ketone was subjected to polymerization conditions using zirconium tetrachloride in the presence of hydrogen chloride. The product in the lubricating oil range from this polymerization possessed a high viscosity index. The tertiary-base olefin polymers in the charge to the zirconium tetrachloride polymerization step had only a slight tendency to polymerize further to lubricating oil range product. Such polymer was therefore easily separated from higher boiling material by fractional distillation.

Ideally, all tertiary-base olefins in a mixture treated with a tin tetrahalide are polymerized and all nontertiary-base mono-olefins are unchanged. Actually, such complete conversion of tertiary-base olefins is often impracticable and unnecessary. The deleterious effect of the presence of tertiary-base olefins in the subsequent polymerization of nontertiary-base mono-olefins is roughly proportional to the concentration of the tertiary-base olefins so that in some cases essentially complete removal is necessary, while in others economic considerations may permit as much as several per cent of the remaining olefinic material to be tertiary-base olefins. When it is stated that olefinic material is freed of its content of tertiary-base olefins, such factors should be taken into consideration.

It is preferred that the conversion of tertiary-base olefins according to my invention be carried out in the liquid phase, and while higher pressures may be used where an additional advantageous effect results, generally a pressure sufficient to maintain an initial liquid phase will be found sufficient. With low-boiling olefins it may be desirable to include a high-boiling inert diluent to aid in forming and maintaining a liquid phase under relatively low pressures. Generally paraffins and cycloparaffins are best suited for such use.

The reaction time for polymerizing tertiary-base olefins in the presence of a tin tetrahalide varies over a wide range depending to a great extent upon the amount of tin tetrahalide catalyst employed in the polymerization step and on the temperature. For example, when the catalyst comprises 10 to 20 weight per cent of the reactant material, a reaction time within the range of thirty to fifty minutes at room temperature and under sufficient pressure to result in liquid phase conditions will produce desirable results. However, under the same conditions except that the amount of catalyst is only about 2 to 5 weight per cent of the reactant material, a reaction time as high as six hours is not uncommon for producing desirable results. The reaction time is lowered by an increase in the temperature employed for the polymerization step.

A tin tetrahalide employed as a catalyst in my process is preferably soluble under the reaction conditions and when a tin tetrahalide catalyst is employed which is normally solid within the temperature range disclosed herein for operating my process, usually a sufficient amount of it can be dissolved in the material being treated to promote the reaction.

The reaction temperature for conducting the conversion in the presence of a tin halide may be chosen within a rather wide range. Higher temperature promote a rapid polymerization but generally result in a product of lower molecular weight. A suitable temperature for any particular case may readily be determined by trial, by one skilled in the art, in the light of the present disclosure, and will generally be found in the range between about 0 and about 240° F. A preferred range is between 30 and 200° F.

The use of tin tetrahalides for the separation of olefins in the manner described is not limited to any specific embodiment because it is evident that the details of such a process will depend upon, among other things, the nature of the charge stock and the use that is to be made of the final products.

My invention will now be illustrated in connection with the accompanying drawing which shows diagrammatically one arrangement of apparatus by which my invention may be practiced.

A hydrocarbon mixture containing both tertiary-base and nontertiary-base mono-olefins is introduced to the system through conduit 10 controlled by a valve 11 to polymerization unit 12, wherein the mixture is treated with a tin tetrahalide catalyst, preferably tin tetrachloride or tin tetrabromide, which acts as a catalyst for the selective polymerization of tertiary-base olefins. Such a catalyst may be conveniently admitted to polymerization zone 12 with the incoming feed stock or separately through conduit 49, controlled by a valve 50. A stabilizer for said catalyst selected from the group consisting of nitro hydrocarbons and ketones having an alpha carbon atom to which is attached a single hydrogen atom may be added to the polymerization zone with the tin halide through conduit 49, or separately through conduit 39 controlled by a valve 40. The polymerization is preferably carried out under conditions suitable to produce low-boiling polymers, such as are suitable for use as motor fuel or as motor fuel stocks, or such as to produce polymers suitable for use as lubricating oil stocks, as previously discussed herein. The polymerization zone 12 will consist of suitable polymerization units together with heaters, coolers, catalyst chambers, and the like known to the art.

When the hydrocarbon mixture to be treated according to my invention contains tertiary-base and nontertiary-base mono-olefins within a wide range of molecular weights it may be desirable to pass such a mixture through conduit 13 controlled by valve 14 to a separating means 15 from which a selected fraction of narrow boiling range or narrow molecular weight range is removed through conduit 16 controlled by a valve 17 and passed to the polymerization zone 12. Material removed through conduit 20 controlled by valve 21 may be further separated into other narrow boiling range fraction and each fraction subjected to individual polymerization conditions which are optimum for polymerization of substantially only tertiary-base olefins in the presence of a tin tetrahalide. Often, however, it will be unnecessary to separate such a mixture into several fractions when desirable results can be obtained by treatment of such a mixture in a single zone under conditions suitable for the polymerization of tertiary-base olefins contained therein.

The effluent from the polymerization zone 12 containing unreacted nontertiary-base mono-olefins passes through pipe 22 and valve 23 to separating means 24. In separating means 24 unreacted non-tertiary-base olefins are separated from polymers produced in unit 12. These polymers may be removed with or without separation into various fractions, through suitable means represented by a conduit 25 controlled by valves 26 and 77. When these polymers, or a fraction thereof, are suitable for use as a lubricating oil stock, such material may be passed from conduit 25 through conduit 70 controlled by a valve 28 for blending with a lubricating oil stock produced in a subsequent part of the process, as will be described. However, when the charge stock to my process contains some diolefins, reactive oxygen-containing compounds, reactive sulfur compounds and/or other gum forming material as well as tertiary-base olefins, other high-boiling material will be produced besides that from tertiary-base olefins. When this is the case, a mixture containing such higher boiling material is removed from separator 24 through conduit 25 and valve 26 and at least a part or all may be discharged from the process through valve 77 or passed through conduit 72 controlled by valve 73 to separating means 74. In separating means 74 desirable polymers produced from tertiary-base olefins may be removed through conduit 27 controlled by valve 78 and passed to conduit 70 for blending as herein described. Undesirable high-boiling material can be removed from separating means 74 through conduit 75 controlled by valve 76. High-boiling material removed through valve 77 may be treated in such a manner as appears desirable. For example, tertiary-base olefin polymers so removed may be passed to a catalytic alkylation step to react with paraffin hydrocarbons for the production of highly branched higher boiling paraffin hydrocarbons of superior antiknock quality and suitable as constituents of motor fuel. Various alkylation catalysts such as hydrofluoric acid, sulfuric acid, aluminum chloride, silica alumina, and the like may be employed in such a step.

A material containing nontertiary-base mono-olefins and substantially free of tertiary-base olefins, as herein discussed, is passed from separating means 24 through a conduit 31 controlled by a valve 29 to a polymerization unit 33 wherein a polymerization is effected to form polymers suitable for use as a lubricating oil stock. The olefins polymerized in unit 33 may be supplemented by nontertiary-base mono-olefins added to the system through a conduit 30 controlled by a valve 32 passing to conduit 31, and in some instances olefins so added may constitute the sole source of olefinic material charged to this step. Polymerization in unit 33 is carried out in the presence of a catalyst active for the polymerization of nontertiary-base olefins, such as aluminum chloride, zirconium chloride, boron fluoride or other halides of aluminum, zirconium and boron associated with a hydrogen halide which may be added through a conduit 37 controlled by a valve 38. However, it is to be understood that such catalysts are not to be considered as equivalents to one another, either in regard to polymerization conditions or characteristics of products formed. The polymerization conditions are such that an optimum yield of polymers suitable for use as a lubricating oil stock are produced as previously has been discussed, and the unit 33 will comprise suitable catalyst chambers, heaters, coolers, pumps, and the like as may be supplied for any particular case by one skilled in the art.

The effluent of unit 33 passes through a conduit 34 controlled by a valve 35 to separating means 36 and when the material passing through conduit 34 consists substantially only of hydrocarbons, the fractions recovered from the material may be separated by simple fractional distillation and one or more fractionating columns as may be readily ascertained by one skilled in the art. In some instances when a mobile polymerization catalyst is used in unit 33, separating means 36 may also include suitable equipment for removal of the catalyst and any impurities contained in the material passing through conduit 34 as may be suited to the particular material being treated. Unreacted olefins and/or low-boiling polymers may be removed from separating means 36 through a conduit 41 controlled by a valve 42 and returned for further reaction in unit 33 by conduits 30 and 31. Undesired low-boiling material, which may include paraffins, is discharged from the system through a conduit 43 controlled by a valve 44. Heavy hydrocarbons, tar and/or sludge may be discharged from the system through a conduit 45 controlled by a valve 46. One or more polymer fractions containing polymers suitable for use as lubricating oil stock are recovered from separating means 36 through one or more conduits illustrated by conduit 47 and may be discharged from the system through valves 52 and 53.

As previously discussed it is generally desirable to subject such polymers to further treatment which may include alkylation with aromatic hydrocarbons, saturation with hydrogen by nondestructive hydrogenation, or the like. Such further treatment will be illustrated by nondestructive hydrogenation and when such treatment is desired, any part or all of a polymer fraction suitable for a lubricating oil stock may be passed from conduit 47 through conduit 51 controlled by a valve 48 to a hydrogenator 54 wherein a major part of the polymer fraction is non-destructively hydrogenated in the presence of a suitable hydrogenation catalyst and in the presence of hydrogen added through conduit 55 controlled by a valve 56. A resulting saturated hydrocarbon material is passed through conduit 57 controlled by a valve 58 to separating means 61. A saturated hydrocarbon material suitable for use as a lubricating oil stock may be recovered from separating means 61 through conduit 62 controlled by valve 63 and any undesired material may be discharged from the system through a conduit 64 controlled by a valve 65.

When the polymerization in unit 12 is such as to produce polymers suitable for use as lubricating oil stock, such polymers may be blended with polymers produced in unit 33 to form a composite product of the two types of polymerization. When a polymer fraction from unit 12 is recovered without additional treatment, a polymer fraction passing through conduit 70 and valve 28 may be passed through valve 71 to conduit 47 and the composite lubricating oil stock recovered through valve 53. When it is desired to subject polymer passing through conduit 70 to subsequent hydrogenation, such polymer may be removed from conduit 70 through a conduit 66 controlled by a valve 67 and passed to conduit 51 and hydrogenator 54 for further treatment as previously discussed.

It is to be appreciated that the drawing just described is diagrammatic only. The various pieces of equipment illustrated and discussed are conventional in nature, and in any application of my invention there will be associated with the individual units shown various pumps, heaters, coolers, reflux accumulators, heat exchangers, fractionating columns, temperature indicating and control devices and the like known in the art and which may be suitably supplied for any particular case by one skilled in the art following the teachings of the reaction conditions and material flows disclosed and discussed herein.

My invention will be further illustrated by the following specific examples, which show various advantages of the invention but which are not necessarily to be construed as limiting the invention.

EXAMPLE I

Isobutene was passed in contact with approximately 100 parts by weight of tin tetrachloride at room temperature and atmospheric pressure at the rate of about 25 parts by weight per hour. The isobutene was bubbled through the body of the tin tetrachloride which was present as a liquid and constantly agitated with a suitable stirring device. Polymerization began immediately. At said addition rate only a small amount of isobutene passed through the system unconverted. The tin tetrachloride catalyst was slowly deactivated, so that after two hours a major portion of the isobutene was passing through unconverted.

The run was repeated at a temperature of 140° F. Under such conditions the corresponding extent of deactivation occurred in about a half hour, showing the marked effect of reaction temperature on deactivation rate.

EXAMPLE II

The run cited in Example I conducted at room temperature was repeated. When the activity of the catalyst had decreased considerably, 0.1 mol per cent of nitrobenzene was added. The catalytic activity was increased only for a short time. Sixty-five mol per cent of nitrobenzene was then added. During an eight hour reaction period, the catalytic activity did not decrease noticeably. The stabilizing effect of nitrobenzene was thus evident.

EXAMPLE III

The run cited in Example I conducted at room temperature was repeated using as catalyst tin tetrachloride plus 50 mol per cent of diisopropyl ketone. Isobutene was bubbled into the catalyst mixture for 22 hours. The reaction rate decreased only slightly throughout the entire reaction period.

EXAMPLE IV

The run in Example I conducted at room temperature was repeated using as catalyst tin tetrachloride plus 50 mol per cent nitromethane. The reaction was continued for eighteen hours. The activity of the catalyst did not noticeably decrease during this period. The temperature increased to a maximum of 104° F. during the experiment. About 24 per cent of the resultant polymer was in the viscosity range of lubricating oil. The characteristics of two fractions are given in Table I.

Table I

| Fraction | Viscosity at 210° F. S. U. V. | Viscosity index |
| --- | --- | --- |
| 8 | 39.8 | 93 |
| 9 | 60.6 | 85 |

EXAMPLE V

The run cited in Example I conducted at room temperature was repeated adding each of the following materials: carbon tetrachloride, tertiary butyl chloride, hydrogen chloride, water. None of these promoted the polymerization of isobutene, and they may actually have hastened the deactivation of the catalyst.

EXAMPLE VI

Tin tetrachloride and liquid propene were sealed in a glass tube in a volume ratio of 1:15. After standing four days at room temperature, no polymer was formed.

EXAMPLE VII

The run cited in Example I conducted at room temperature was repeated using tin tetrachloride plus pentene-1. No polymer was produced. This run was repeated adding each of the following compounds: carbon tetrachloride, tertiary butyl chloride, water, nitromethane, and diisopropyl ketone. No polymer was obtained from any of these runs.

EXAMPLE VIII

The olefin 4-methylpentene-2 was not polymerized at room temperature using tin tetrachloride catalyst either alone or with stabilizers such as employed in Example VII.

EXAMPLE IX

An olefin-containing charge stock boiling between 122 and 167° F., obtained from thermal conversion of low-boiling hydrocarbons, was polymerized with a catalyst consisting of aluminum chloride plus hydrogen chloride promoter in liquid phase at 86 to 95° F. The catalyst was rapidly deactivated with the formation of a dark-colored insoluble residue. The resulting polymer fraction in the lubricating oil viscosity range possessed viscosity index values of 10 to 35.

Another portion of this stock was treated with 10 per cent by weight of a tin tetrachloride-nitrobenzene mixture at 140° F. for a two hour period. The unreacted olefin-paraffin constituents were separated by distillation. It was found that about 20 per cent of the total olefin content of the charge was removed in this treatment. The remaining olefin-paraffin mixture in the 122 to 167° F. boiling range was treated with aluminum chloride plus hydrogen chloride promoter in liquid phase at 86 to 95° F. Only a small proportion of dark-colored sludge was formed during polymerization. The resulting polymer fractions in the lubricating oil viscosity range, which were equivalent in volume to those produced in the preceding experiment, possessed viscosity index values of 40 to 65. The tin tetrachloride treatment thus removed from the olefin-containing charge stock materials which adversely affected the activity of the aluminum chloride catalyst and also materials which produced low viscosity index polymers.

In view of many possible modifications of the process that will be obvious to those skilled in the art, the invention should not be limited unduly by the foregoing specification and examples, but it should be understood to be extensive in scope and equivalents, within the limits of the appended claims, without departing from the spirit of the disclosure and teachings.

I claim:

1. In a process for the selective polymerization of tertiary-base olefins which are associated with nontertiary-base olefins, the improvement which comprises subjecting a liquid hydrocarbon mixture which contains such olefins to the polymerizing action of a tin tetrahalide associated with a ketone in which there is an alpha carbon which has a single hydrogen to polymerize only tertiary-base olefins, and recovering from said polymerization a hydrocarbon mixture which contains unreacted nontertiary-base olefins and is substantially free from tertiary-base olefins.

2. In a process for the selective polymerization of tertiary-base olefins which are associated with nontertiary-base olefins, the improvement which comprises subjecting a liquid hydrocarbon mixture which contains such olefins to the polymerizing action of a tin tetrahalide associated with diisopropyl ketone to polymerize only tertiary-base olefins, and recovering from said polymerization a hydrocarbon mixture which contains unreacted nontertiary-base olefins and is substantially free from tertiary-base olefins.

3. A process for the polymerization of tertiary-base olefins which comprises subjecting such olefins to the polymerizing action of a tin tetrahalide associated with a ketone in which there is an alpha carbon atom to which is attached a single hydrogen atom.

4. A process according to claim 3 wherein said tin tetrahalide is tin tetrachloride and said ketone is diisopropyl ketone.

GRANT C. BAILEY.